US009221970B2

(12) United States Patent
Schultz et al.

(10) Patent No.: US 9,221,970 B2
(45) Date of Patent: *Dec. 29, 2015

(54) NANOCALCITE COMPOSITES

(75) Inventors: William J. Schultz, North Oaks, MN (US); Chad A. Haraldson, Apple Valley, MN (US); Nathan E. Schultz, Lakeland, MN (US); Wendy L. Thompson, Roseville, MN (US); James E. Thorson, Hudson, WI (US); Douglas P. Goetz, St. Paul, MN (US); Steven C. Hackett, Oakdale, MN (US); James M. Nelson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/133,878

(22) PCT Filed: Dec. 17, 2009

(86) PCT No.: PCT/US2009/068359
§ 371 (c)(1),
(2), (4) Date: Jun. 9, 2011

(87) PCT Pub. No.: WO2010/080459
PCT Pub. Date: Jul. 15, 2010

(65) Prior Publication Data
US 2011/0245376 A1  Oct. 6, 2011

Related U.S. Application Data

(60) Provisional application No. 61/139,145, filed on Dec. 19, 2008.

(51) Int. Cl.
*C08L 63/00*    (2006.01)

(52) U.S. Cl.
CPC ..................... *C08L 63/00* (2013.01)

(58) Field of Classification Search
CPC .. C08L 67/00; C08L 71/02; C08K 2003/0818
USPC ........................................................ 523/223
See application file for complete search history.

(56) References Cited

U.S. PATENT DOCUMENTS

| 3,956,230 | A | * | 5/1976 | Gaylord | ........................ 523/209 |
| 4,447,564 | A | | 5/1984 | Grimmer | |
| 4,478,963 | A | | 10/1984 | McGarry | |
| 4,624,971 | A | | 11/1986 | Van Tao et al. | |
| 5,648,407 | A | | 7/1997 | Goetz et al. | |
| 5,694,701 | A | | 12/1997 | Huelsmann et al. | |
| 5,980,697 | A | | 11/1999 | Kolb et al. | |
| 6,342,100 | B1 | | 1/2002 | Nover et al. | |
| 6,495,653 | B1 | * | 12/2002 | Kinsho | ............................ 528/73 |
| 6,656,975 | B1 | * | 12/2003 | Christiano et al. | ............... 516/22 |
| 7,596,986 | B2 | | 10/2009 | Daniels et al. | |
| 7,709,090 | B2 | * | 5/2010 | Nover et al. | ................... 428/403 |
| 7,863,367 | B2 | * | 1/2011 | Takahashi et al. | ............ 524/425 |
| 8,217,098 | B2 | * | 7/2012 | Ueno et al. | ..................... 523/413 |
| 2001/0040007 | A1 | | 11/2001 | Hartman et al. | |
| 2002/0156152 | A1 | | 10/2002 | Zhang et al. | |
| 2003/0032693 | A1 | | 2/2003 | Angeletakis et al. | |
| 2003/0055207 | A1 | | 3/2003 | Xu et al. | |
| 2003/0198780 | A1 | * | 10/2003 | Campese et al. | ............. 428/141 |
| 2004/0076574 | A1 | | 4/2004 | Xu et al. | |
| 2004/0092639 | A1 | | 5/2004 | Kasahara et al. | |
| 2004/0242748 | A1 | | 12/2004 | Takahashi et al. | |
| 2007/0014267 | A1 | | 1/2007 | Lam et al. | |
| 2007/0025887 | A1 | | 2/2007 | Baeuerle et al. | |
| 2007/0141267 | A1 | * | 6/2007 | Sonnenschein et al. | ... 427/407.1 |
| 2007/0199477 | A1 | | 8/2007 | Hill et al. | |
| 2008/0075963 | A1 | | 3/2008 | Dershem | |
| 2008/0227901 | A1 | | 9/2008 | Lefevre et al. | |
| 2009/0137706 | A1 | | 5/2009 | Healy et al. | |
| 2010/0099800 | A1 | | 4/2010 | Ueno et al. | |

FOREIGN PATENT DOCUMENTS

| EP | 1 426 390 | 6/2004 |
| EP | 2 036 944 | 3/2009 |
| JP | 06-329896 | 11/1994 |
| JP | 10-330645 | 12/1998 |
| JP | 2006 188552 | 7/2006 |
| WO | WO 00/49081 | 8/2000 |
| WO | WO 03/057740 | 7/2003 |
| WO | WO 2007/014878 | 2/2007 |
| WO | WO 2007/108217 | 9/2007 |
| WO | WO 2008/027979 | 3/2008 |
| WO | WO 2008/105189 | 9/2008 |
| WO | WO 2010/080459 | 7/2010 |
| WO | WO 2011/050121 | 4/2011 |

OTHER PUBLICATIONS

Avella et al., "Novel PMMA/CaCO$_3$ Nano-composites Abrasion Resistant Prepared by an in Situ Polymerization Process," *Nano Letters*, vol. 1, No. 4, pp. 213-217, (2001).

Jin et al., "Interfacial toughness properties of trifunctional epoxy resins/calcium carbonate nanocomposites," *Materials Science and Engineering A*, 475, pp. 190-193, (2008).

Kresse et al., "Ab initio molecular-dynamics for liquid metal-amorphous-semiconductor transition in germanium," *Physical Review B*, vol. 49, No. 20, pp. 14251-14271, (May 15, 1994).

Kresse et al., "Ab initio molecular-dynamics for liquid metals," *Physical Review B*, vol. 47, No. 1, pp. 558-561, (Jan. 1, 1993).

Kresse et al., "Efficiency of ab-initio total energy calculations for metals and semiconductors using a plante-wave basis set," *Computational Materials Science* 6, pp. 15-50, (1996).

(Continued)

*Primary Examiner* — Hannah Pak
(74) *Attorney, Agent, or Firm* — Dena M. Ehrich

(57) ABSTRACT

Compositions comprising surface-modified nanocalcite particles dispersed in a curable resin, and to coatings and fibrous composites incorporating such compositions are described. The surface-modifying agents include a binding group ionically associated with the calcite and a compatiblizing segment, compatible with the curable resin. The surface-modifying agent may also include a reactive group capable of reacting with the curable resin. Methods of preparing nanocalcite composites and coating a fibrous composites prepared from such nanocalcite composites are also described.

13 Claims, No Drawings

(56) References Cited

OTHER PUBLICATIONS

Kresse et al., "Efficient iterative schemes for *ab indio* total-energy calculations using a plane-wave basis set" *Physical Review B*, vol. 54, No. 16, pp. 11169-11186, (Oct. 15, 1996).

Lu et al., Polymer/calcium carbonate nanocomposites; *Polymer Nanocomposites*, CRC Press, pp. 412-439, (2006).

Perdew et al., "Generalized Gradient Approximation Made Simple," *Physical Review Letters*, vol. 77, No. 18, pp. 3865-3868, (Oct. 28, 1996).

Van Krevelen, *Properties of Polymers: Their Correlation with Chemical Structure; Their Numerical Estimation and Prediction from Additive Group Contributions*, third edition, Elsevier Science Publishers B.V., Chapter 7, "Cohesive Properties and Solubility," pp. 189-225, (1990).

Wang et al., "Nano-$CaCO_3$/polypropylene composites made with ultra-high-speed mixer," *Journal of Materials Science Letters 21*, pp. 985-986, (2002).

Yu et al., "Novel Uncured Epoxy Resin/$CaCO_3$ Nanocomposites," *Polymer-Plastics Technology and Engineering*, 45: pp. 809-813, (2006).

Yu et al., "Preparation of Exoxy Resin $CaCo_3$ Nancomposites and Performance of Resultant Powder Coatings," *Journal of Applied Polymer Science*, vol. 101, pp. 2656-2660, (2006).

Yu et al., "Study on nano-$CaCO_3$modified epoxy powder coatings," *Progress in Organic Coatings*, 55, pp. 296-300, (2006).

Zhang et al., "Preparation and characterization of polystyrene/butyl acrylatel nano-$CaCO_3$ composites," *Journal of Beijing University Chemical Technology*, 32, pp. 1-4, (2005), English Abstract.

ASTM Designation: D 5045-99, "Standard Test Methods for Plane-Strain Fracture Toughness and Strain Engergy Release Rate of Plastic Materials," (2007) 9 pages.

ASTM Designation: D 2583-07, "Standard Test Method for Indentation Hardness of Rigid Plastics by Means of a Barcol Impressor," (2001) 4 pages.

Handbook of Thermoset Plastics, Second Edition, Sidney H. Goodman, Ed. (1998) p. 122.

Melo et al., "High Energy Mill Processing of Polymer Based Nanocomposites", Journal of Composite Materials, 2363, (2008).

PCT International Search Report for PCT/US2009/068359 dated Mar. 29, 2010, 3 pages.

\* cited by examiner

NANOCALCITE COMPOSITES

CROSS REFERENCE TO RELATED APPLICATIONS

This application is a national stage filing under 35 U.S.C. 371 of PCT/US2009/068359, filed Dec. 17, 2009, which claims priority to U.S. Provisional Application No.61/139,145, filed Dec. 19, 2008, the disclosures of which are incorporated by reference in their entirety herein.

FIELD

The present disclosure relates to compositions comprising surface-modified nanocalcite particles dispersed in a curable resin, and to coatings and fibrous composites incorporating such compositions. Methods of preparing nanocalcite composites are also described.

BACKGROUND

Nanoparticle-containing resins have been used as coatings and as the impregnating resin of fibrous composites. Generally, the addition of nanoparticles provides improved strength to weight ratios compared to the pure resins. These materials have been used in a wide variety of applications including coatings for vehicles (e.g., marine gel coats) and wind blades, and composite structures in e.g., sporting goods, wind blades, and vehicle fabrication.

SUMMARY

Briefly, in one aspect, the present disclosure provides compositions comprising surface-modified nanoparticles dispersed in a curable resin, wherein the surface-modified nanoparticles comprise calcite cores and a first surface-modifying agent bonded to the calcite. In some embodiments, the compositions comprise at least 10 wt. % nanoparticles based on the total weight of the nanoparticles and the curable resin. In some embodiments, the compositions comprise no greater than 5 wt. % solvent. In some embodiments, at least 70% of the calcite cores have an average size of less than 400 nm as measured by the Calcite Particle Size Procedure.

In some embodiments, the first surface-modifying agent comprises a binding group ionically bonded to the calcite and a compatiblizing segment compatible with the curable resin. In some embodiments, the binding group has a bond energy of at least 0.70 electron volts to calcite as calculated using density functional theory. In some embodiments, the binding group comprises a phosphonic acid, a sulfonic acid, or a combination thereof.

In some embodiments, the compatiblizing group of the first surface-modifying agent comprises at least one of a polyethylene oxide and a polypropylene oxide. In some embodiments, the first surface-modifying agent further comprises a reactive group capable of reacting with the curable resin. In some embodiments, the surface-modifying agent is a zwitterion. In some embodiments, the surface-modifying agent comprises a polyetheramine.

In some embodiments, the compositions further comprise a second surface-modifying agent bonded to the calcite. In some embodiments, the second surface-modifying agent comprises a binding group and a reactive group capable of reacting with the curable resin.

In some embodiments, the curable resin comprises an epoxy resin. In some embodiments, the curable resin is crosslinked. In some embodiments, the surface-modifying agent is reacted with the curable resin. In some embodiments, the compositions further comprise core shell rubber particles.

In another aspect, the present disclosure provides coated articles comprising a substrate and a cured composition according to the present disclosure bonded to at least a portion of the substrate. In yet another aspect, the present disclosure provides fibrous composites comprising a composition of the present disclosure and reinforcing fibers.

In another aspect, the present disclosure provides methods of making compositions, the methods comprising dispersing calcite particles with a surface-modifying agent and a curable resin, reducing the size of the calcite particles such that at least 70% of the calcite particles have an average size of less than 400 nm as measured by the Calcite Particle Size Procedure, and ionically bonding a binding group of the surface-modifying agent with the calcite particles. In some embodiments, the methods further comprise mixing coreshell rubber particles into the curable resin.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Generally, the compositions of the present disclosure comprise surface-modified nanoparticles dispersed in a curable resin. Generally, any known curable resin or combination of resins may be used. In some embodiments, thermosetting resins and radiation-curable (e.g., ultraviolet light-cured or electron beam-cured) resins may be used.

Suitable resins include, e.g., epoxy resins, polyester resins, bismalimides resins, cyanate ester resins, vinyl ester resins, acrylic resins, urethane resins, and urethane acrylate resins. In some embodiments, polyepoxide resins, including aliphatic and aromatic polyepoxide resins, may be used. Exemplary epoxy resins include those based on bisphenol A, e.g., those available under the trade name EPON™ from Hexion Specialty Chemicals, Inc., Houston, Tex.

The surface-modified nanoparticles of the present disclosure comprise calcite cores and a surface-modifying agent bonded to the calcite. Calcite is the crystalline form of calcium carbonate and typically forms rhombohedral crystals.

In some embodiments, at least 70%, e.g., at least 75% of the calcite cores have an average size of less than 400 nm. In some embodiments, at least 90%, in some embodiments, at least 95%, or even at least 98% of the calcite cores have an average size of less than 400 nm. In some embodiments, for example when using the nanocalcite containing resins to produce fibrous composites, it may be desirable to control, e.g., minimize or even eliminate, filtering of the nanocalcite by the fibers. Larger particles or particle aggregates may be filtered or separated from the resin while the mixture is pressured through a highly compressed fiber array in the process of making a continuous fiber composite. This can result in a non-uniform distribution of particles and resin throughout the final composite resulting in decreased physical properties.

Generally, the surface-modifying agents of the present disclosure include at least a binding group and a compatiblizing segment:

Comp. Seg.—Binding Group;

wherein "Comp. Seg." refers to the compatiblizing segment of the surface-modifying agent.

The compatiblizing segment is selected to improve the compatibility of the calcite nanoparticles with the curable resin. Generally, the selection of the compatiblizing group depends on a number of factors including the nature of the curable resin, the concentration of the nanoparticles, and the desired degree of compatibility. For epoxy resin systems, useful compatiblizing agents include polyalkylene oxides, e.g., polypropylene oxide, polyethylene oxide, and combinations thereof.

In some embodiments, the compatiblizing segment may be selected to provide a positive enthalpy of mixing for the composition containing the surface-modified nanoparticles and the curable resin. If the enthalpy of mixing is positive, the dispersion of nanoparticles in the resin is typically stable. To ensure a positive enthalpy of mixing, the solubility parameter of the compatiblizing segment can be matched to the solubility parameter of the curable resin. In some embodiments, the materials can be selected such that the difference in these solubility parameters is no more than $4\ J^{1/2}\ cm^{-3/2}$ and, in some embodiments, no more than $2\ J^{1/2}\ cm^{-3/2}$ as determined according to *Properties of Polymers; Their Correlation with Chemical Structure; Their Numerical Estimation and Prediction from Additive Group Contributions*, third edition, edited by D. W. Van Krevelen, Elsevier Science Publishers B. V., Chapter 7, 189-225 (1990)), i.e., the "Solubility Parameter Procedure."

There are several methods known to determine the solubility parameter of a material such as a compatiblizing segment or a resin. For example, the solubility parameter of the material can be determined from measurements of the extent of equilibrium swelling of the material in a range of solvents of differing solubility parameters. The solubility parameters of the solvents themselves can be determined from their heats of evaporation. The solubility parameter delta ($\delta$) is related to the cohesive energy $E_{coh}$ and the specific volume V by the relationship $\delta=(E_{coh}/V)^{1/2}$. For solvents of low molecular weight, the cohesive energy is closely related to the molar heat of evaporation $\Delta H_{vap}$ according to $E_{coh}=\Delta H_{vap}-p\Delta V=\Delta H_{vap}-RT$. Thus, $E_{coh}$ and $\delta$ can be calculated from the heat of evaporation of the solvent or from the course of the vapor pressure as a function of temperature. To determine the solubility parameter of the material, a plot of equilibrium swelling of the material versus the solubility parameter of the solvents is generated. The solubility parameter of the material is defined as the point on this plot where maximum swelling is obtained. Swelling will be less for solvents having solubility parameters that are less than or greater than that of the material. Alternatively, there are several known methods for theoretically estimating the solubility parameter of a material based on the additive contributions of functional groups.

The binding group bonds to the calcite, connecting the surface-modifying agent to the calcite core. Unlike many silica-based nanoparticle systems wherein the surface-modifying agents are covalently bonded to the silica, the surface-modifying agents of the present disclosure are ionically bonded to (e.g., associated with) the calcite.

In order to retain the surface-modifying agents with the calcite cores during processing of the compositions, it may be desirable to select binding groups having high bond energies to calcite. Bond energies can be predicted using density functional theory calculations. In some embodiments, the calculated bond energies may be at least 0.6, e.g., at least 0.7 electron volts. Generally, the greater the bond energy the greater the likelihood that the binding group will remain ionically associated with the particle surface. In some embodiments, bond energies of at least 0.8, e.g., at least 0.9, or even at least 0.95 electron volts, may be useful.

In some embodiments, the binding group comprises a phosphonic acid, e.g., surface-functionalizing agents having a formula:

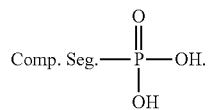

In some embodiments, the binding group comprises a sulfonic acid, e.g., surface-functionalizing agents having a formula:

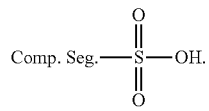

In some embodiments, the surface-modifying agent also comprises a reactive group, i.e., a group capable of reacting with the curable resin, e.g., during the curing process. This can result in the nanocalcite particle being strongly bonded into the resin matrix and may lead to an improvement in the physical properties of the resulting cured nanocomposite. Generally, the reactive group is selected based on the nature of the curable resin. In some embodiments, the reactive group may be located on the end of the compatiblizing segment:

Rx. Group—Comp. Seg.—Binding Group;

wherein "Rx. Group" is the reactive group. In some embodiments, the reactive group may be located along the backbone of or pendant to the backbone of the compatiblizing segment. In some embodiments, the reactive group may be located between the compatiblizing segment and the binding group:

Comp. Seg.—Rx. Group—Binding Group.

In some embodiments, a linking group is present connecting the compatiblizing segment with the binding group:

Comp. Seg.—Linking Group—Binding Group.

For example, in some embodiments, the surface-modifying agent comprises a polyetheramine. Exemplary polyetheramines include those available under the trade name JEFFAMINE® available from Huntsman Corporation, The Woodlands, Tex. The polyether serves as a compatiblizing segment, while the amine is the linking group linking the compatiblizing segment with the binding group.

In some embodiments, the surface-modifying agent comprises a zwitterion, i.e., a compound carrying a net charge of zero, but which is capable of carrying a formal positive and negative charge on different atoms. In some embodiments, the formal negative charge is carried by the binding group. In some embodiments, the formal positive charge is carried on the nitrogen atom of an amine, e.g., an amine linking group. In such embodiments, the amine may serve as both the linking group and the reactive group.

Generally, the compositions of the present disclosure comprise at least 10 wt. %, in some embodiments, at least 20 wt. %, e.g., at least 30 wt. %, at least 40 wt. %, or even at least 50 wt. % of the surface modified nanoparticles based on the total weight of the nanoparticles and the curable resin. In some embodiments, it may be useful to have a low viscosity composition, e.g., when the composition is to be sprayed (e.g., when applying a coating), or must flow through fibers (e.g., when making fibrous composites).

Viscosity can be reduced by diluting the composition in solvents, e.g., water, organic solvents, or a combination thereof. If solvents are used, the solvent or combination of solvents can be readily selected such that the resins are soluble. While useful in some applications, the inclusion of solvents tends to increase costs, handling requirements, and process steps. In some embodiments, the compositions of the present disclosure comprise no greater than 5 wt. %, optionally no greater than 2 wt. %, solvent.

In some embodiments, the compositions of the present disclosure may include additional additives such as curing agents, cure accelerators, catalysts, crosslinking agents, dyes, pigments, flame retardants, impact modifiers, and flow control agents. In some embodiments, the compositions may include tougheners, e.g., rubber tougheners. Exemplary rubber tougheners include coreshell rubbers. In some embodiments, nano-sized coreshell rubber tougheners may be used, i.e., coreshell rubber tougheners having an average size of less than 1 micron. In some embodiments, the nano-sized coreshell rubber tougheners have an average size of less than 500 nm, less than 250 nm, or even less than 100 nm. In some embodiments, micron-sized coreshell rubber tougheners may be used, i.e., coreshell rubber tougheners having an average size of greater than 1 micron, e.g., 1 to 10 microns.

The compositions of the present disclosure may be cured. In some embodiments, the curable resin is crosslinked. Any known crosslinking method may be used including exposure to thermal energy or actinic radiation (e.g., ultraviolet light and electron beam radiation). In some embodiments, the curable resin may also react with the surface-modifying agent. For example, in some embodiments, a reactive group of the surface-modifying agent may react with, e.g., covalently bond with, the curable resin.

Various embodiments of the compositions of the present disclosure may be used in a wide variety of applications. In some embodiments, the compositions may be applied to a surface of an article. Such coating may be cured, e.g., crosslinked.

In some embodiments, the compositions of the present disclosure may be used to form fibrous composites. For example, in some embodiments, reinforcing fibers may be impregnated with the composition to form a composite article. Composites may be formed using any known means including, e.g., resin transfer molding (RTM), filament winding, tow placement, resin infusion processes, pultrusion process, or traditional prepreg processes. The resin may then be cured using any known means including exposure to thermal energy and/or actinic radiation.

Generally, any fibers suitable for use in fibrous composites may be used. Exemplary fibers include carbon fibers, glass fibers, ceramic fibers, boron fibers, silicon carbide fibers, polyimide fibers, polyamide fibers, and polyethylene fibers. Combinations of materials may also be used. Generally, the form of the fibers is not particularly limited. Exemplary fiber forms include unidirectional array of individual continuous fibers, woven fabric, knitted fabric, yarn, roving, braided constructions and non-woven mat.

Generally, the compositions of the present disclosure may used in a wide variety of applications including as coatings on, e.g., wind blades and as gel coats on, e.g., vehicles, e.g., boats; and as composites used in the manufacture of, e.g., sporting goods (e.g., rackets, fishing poles, hockey sticks, baseball bats, sailing masts, and the like); wind blades, vehicles and vehicle parts including automobiles, ships, aircraft, and satellites, and space vehicles.

EXAMPLES

TABLE 1

Materials used in the preparation of the examples.

| I.D. | Description | Source |
| --- | --- | --- |
| NPCC-111 | nanocalcite | NanoMaterials Technology LTD, Singapore |
| NPCC-201 | nanocalcite | NanoMaterials Technology LTD, Singapore |
| SOCAL 31 | nanocalcite | Solvay Specialty Chemicals, LTD. |
| EPON 825 | epoxy resin | Hexion Specialty Chemicals, Inc. |
| DETDA | diethyltoluene diamine | ETHACURE-100 Albemarle Corporation, Louisiana, USA |
| CAPS | 3-(cyclohexylamino)-1-propanesulfonic acid | Alpha Aesar Corp. |
| Dicy | dicyandiamide epoxy curative | Amicure ® CG1400 Air Products |
| TDI/Urea | toluene diisocyanate-urea epoxy accelerator | OMICURE U-24 Emerald Performance Materials |
| D530 | phosphoric acid polyester dispersant | SOLPLUS ® D530 Lubrizol Corp. |
| D-111 | phosphoric acid polyester dispersant | DISPERBYK D-111 BYK-Chemie GmbH |

Test Methods

Fracture Toughness Procedure. Fracture toughness was measured according to ASTM D 5045-99 using a compact tension geometry, wherein the specimens had nominal dimensions of 3.18 cm by 3.05 cm by 0.64 cm (1.25 in. by 1.20 in. by 0.25 in.). The following parameters were employed: W=2.54 cm (1.00 in.); a=1.27 cm (0.50 in.); and B=0.64 cm (0.25 in.). In addition, a modified loading rate of 0.13 cm/minute (0.050 inches/minute) was used. Values for $K_{Ic}$ are reported in units of megaPascals times the square root of meters, i.e., $MPa \cdot m^{1/2}$.

Shear Modulus Procedure. Shear modulus was determined with an RDA-700 Rheometrics Dynamic Analyzer (available from Rheometrics, Inc., Piscataway, N.J.) using a torsion rectangular test mode. Test specimens were machined to 5.08 cm×1.27 cm×0.16 cm. Data were collected at 5° C. intervals from 35° C. to above the glass transition temperature of the resin at a heating rate of 5° C. per minute with a one minute thermal soak before each measurement was taken. The initial strain was 0.45% and the machine was in the strain adjustment mode. The frequency was 10 radians per second.

Glass Transition Temperature Procedure. The glass transition temperature (Tg) was determined with a TA Instruments 912 Differential Scanning calorimeter (available from TA Instruments, New Castle, Del.). The heating rate was 40° C. per minute.

Calcite Concentration Procedure. A 20 to 50 milligram sample of calcite in epoxy resin was placed in a TA Instruments TGA 500 thermogravimetric analyzer. The sample temperature was ramped up in air at 30° C. per minute from 50° C. to 900° C., and then held at 900° C. for 3 minutes. The residual weight was assumed to be the CaO remaining in the sample after volatilizing all organics and carbon dioxide from the calcite. The calcite concentration in the original sample was calculated by dividing the weight percent CaO residue by 0.56.

Viscosity Procedure. The viscosity was measured on a BOHLIN C-VOP rheometer using a 50 cm parallel plate configuration. The measurements were made using a frequency scan from 0.01 to 100 Hertz (Hz). The value at 52 Hz was selected as a representative value for comparing resin systems.

Resin Tensile Strength Procedure. The tensile strength of the resins was measured according to ASTM D638 "Standard Test Method for Tensile Properties of Plastics" using a "Type I" specimen. The loading rate was 1.27 mm/min (0.05 in/min).

Composite Compression Strength Procedure. The compression strength of the composite was measured according to Suppliers of Advanced Composite Materials Association test method SACMA SRM 1R-94 "Recommended Test Method for Compressive Properties of Oriented Fiber-Resin Composites."

Calcite Particle Size Procedure. The particle size of the calcite was measured by laser diffraction using a HORIBA LA-950. The optical model for the calculation used a refractive index of 1.6000 for calcite and 1.3591 for the solvent acetone. The second differential method was used for smoothing and was based on 150 iterations. The calcite dispersion was diluted to approximately 1% solids with acetone. The sample was then added to the measurement cell, which was filled with acetone, until the transmittance was between the recommended levels of 85% to 95%. The reported values of percent average particle size less than 400 nm (% less than 400 nm) were based on volume fraction averages.

Binding Energy.

Generally, surface-modifying agents include a compatibilizing group to aide in dispersing the nanoparticles in resin, and a binding group to associate the compatiblizing group with the nanoparticles. The binding energy to calcite of various common and potential binding groups was determined using density functional theory calculations. Details regarding such calculations are available in Pendrew, J. P.; Burke, K. J.; Ernzerhof, M.; Phys. Rev. Lett. 1996, 3865, 77.

Binding Energy Calculation Procedure. The binding energies of different functional groups to the surface of nanocalcite with periodic boundary condition density functional theory (PBC-DFT) were calculated. In this approach, the surface of the nanoparticle was represented a 2D-periodic slab. The calculations were actually periodic in three dimensions, but a 20 Angstrom layer of vacuum was included to prevent the slabs from interacting with each other in the z-direction. As such, the slab had 2D periodicity. The slabs included three to four layers and were cleaved along a Miller plane. For the case of nanocalcite, the surface was cleaved along the {1014} surface.

In performing the calculation, a calcium rich surface was assumed. In the case the calcium rich surface, the under-coordinated calcium ions on the surface were terminated with hydroxyl groups. The isolated molecules were calculated in a periodic box that had an edge length of 11 or 12 Angstroms. The distance was large enough to prevent the molecules from interacting with each other.

The PBE density functional (Perdew, J. P.; Burke, K.; Ernzerhof, M.; Phys. Rev. Lett. 1996, 3865, 77), as implemented in the VASP (Vienna ab-initio simulation package) computer program ((a) Kresse, G.; Hainer, J. Phys. Rev. B 1993, 588, 47; (b) Kresse, G.; Hafner, J. Phys. Rev. B 1994, 251, 49; (c) Kresse, G.; Furthmueller, J. Comput. Mater. Sci. 1996, 15, 6; and (d) Kresse, G.; Furthmueller, J. Phys. Rev. B 1996, 11 169, 54) was used for these calculations. The pseudopotentials used were of the plane-wave augmented wave type and distributed with the VASP computer program. For the case of calcium, the 3p electrons were treated explicitly with the pseudopotential. A plane wave cutoff of 400 eV and 2X2X1 k-point mesh was used for the slab calculations. For the isolated molecules, the pseudopotentials and plane wave cutoffs were identical to those used for the slab calculations, except a 1X1X1 k-point mesh was used.

The binding energies (BE) were calculated assuming a calcium rich surface:

For the calcium rich surface:

$$BE = E(\text{Slab}) + E(\text{Molecule}) + E(\text{Water}) - E(\text{Slab+Molecule}) \quad (1)$$

wherein E(Slab+Molecule), E(Slab), E(Molecule), and E(Water) are the electronic energies of the complex, isolated slab, isolated molecule, and an isolated water molecule, respectively. In all cases, the geometries were optimized to their respective minima.

The calculated values in electron volts (e.v.) are summarized in Table 2, assuming a calcium rich surface.

TABLE 2

Calculated bond energy to calcite.

| Binding group | Structure | Binding energy (e.v.) |
|---|---|---|
| phosphonic acid | R—P(=O)(OH)—OH | 1.18 |
| sulfonic acid | R—S(=O)(=O)—OH | 0.98 |
| phosphinic acid | R—P(=O)(R)—OH | 0.68 |
| sulfinic acid | R—S(=O)—OH | 0.68 |
| hydroxamic acid | R—C(=O)—N(H)—OH | 0.60 |
| carboxylic acid | R—C(=O)—OH | 0.51 |
| sulfamic acid | R—N(H)—SO$_3$H | 0.44 |
| pyrocatechol | HO—C$_6$H$_4$—OH (catechol) | 0.35 |

Based on these modeling results, the ligands identified in Table 3 were synthesized, each comprising a binding group and a compatiblizing segment. Polyether compatiblizing segments, either polyethylene oxide or polypropylene oxide, were selected for dispersing the calcite nanoparticle into a diglycidyl ether of bisphenol A epoxy resin.

Hydroxamic acid ligand. Ligand L-I was prepared as follows. To 30 g (0.050 mol) of polyetheramine (JEFFAMINE M-600, Huntsman) was added 73 g (0.5 mol) diethyl oxalate (Alfa Aesar). After heating at 50° C. for 24 hours, the heat was increased to 80° C. and a vacuum was pulled to remove residual diethyl oxalate and ethanol. A 50% aqueous hydroxylamine solution (3.3 g, 0.05 mol, Aldrich) was then added and stirred at 80° C. for 16 hours. The water was removed under reduced pressure. The hydroxamic acid ligand was isolated as a pale brown oil and used without purification.

Carboxylic acid ligands. Ligands L-II, L-III, and L-VI have the general formula $CH_3—(OCH_2CH_2)_n—O_2CCH_2CH_2CO_2H$ and were prepared using different length poly(ethylene glycol)s as follows. To stirred solution of 100 g (0.284 mol) poly(ethylene glycol) methyl ether (purchased from Alfa Aesar) in 500 mL tetrahydrofuran (purchased from EMD Sciences) was added 42.6 g (0.426 mol) succinic anhydride (purchased from Alfa Aesar). Once the solid was dissolved, 1.46 g (0.016 mol) 4-(dimethylamino)pyridine (purchased from Alfa Aesar) was added. After 18 hours, the tetrahydrofuran was removed under reduced pressure. The oily residue was dissolved in 200 mL water and treated with 400 mL of 4 M hydrochloric acid (made by diluting 100 mL concentrated hydrochloric acid with 300 ml, water). This was extracted with dichloromethane (2×500 mL). The combined organic fractions were washed with water and saturated aqueous sodium chloride. The organic fraction was dried over magnesium sulfate, filtered and concentrated under reduced pressure to a clear, nearly colorless liquid. 1H NMR was consistent with the product, and residual succinic acid. The crude succinic acid half ester was used without further purification.

Phosphonic acid ligand. Ligand L-IV was prepared as follows. To 355.8 g (1.017 mol) of poly(ethylene glycol) methyl ether (purchased from Alfa Aesar, Mn=350) at 50° C. was dropwise added 152.8 g (1.284 mol) of thionyl chloride with stirring. Evolved gases were vented through a trap containing 25% aqueous sodium hydroxide. After the addition was complete, the temperature of the reaction mixture was raised to 70° C. After 4 hours, nitrogen was slowly bubbled through the mixture as the temperature was raised to 90° C., and the reaction mixture was held at 90° C. overnight with continued nitrogen bubbling. Remaining volatiles were separated by heating for 2 hours at 120° C. under reduced pressure, leaving 338.7 g of a clear, light amber liquid. The 1H and $^{13}C$ NMR spectra of the material were consistent with the structure of the desired product, and the crude chloride was used without further purification.

A mixture of 150.0 g (0.430 mol) of the crude chloride prepared above and 214.0 g (1.290 mol) of triethyl phosphite was heated at 170° C. After 3 days, an additional 100.0 g (0.600 mol) of triethyl phosphite was added, and the reaction temperature was increased to 180° C. After an additional 2 days at 180° C., a third portion of 100.0 g (0.600 mol) of triethyl phosphite was added, and heating at 180° C. was continued. After an additional 2 days, 13C NMR analysis of the reaction mixture indicated the absence of the starting chloride at 43 ppm. Diethyl ethylphosphonate and other volatiles were distilled to a final bath temperature of 130° C., by 35-60° C. at 0.05 mm Hg, leaving 187.5 g of a clear, light yellow liquid. The 1H and $^{13}C$ NMR spectra of the material were consistent with the structure of the desired product, and the crude diethyl phosphonate ester was used without further purification.

To a solution of 90.0 g (0.257 mol) of the crude diethyl phosphonate ester prepared above in 200 mL of dichloromethane was added 98.0 g (0.643 mol) of bromotrimethylsilane. After 18 hours at room temperature, the solution was concentrated under reduced pressure, and the intermediate silylphosphonate ester was dissolved in 250 mL of methanol. The resultant solution was stirred at room temperature for 2 hours. The solution was concentrated under reduced pressure, the concentrate was again dissolved in 250 mL of methanol, and the resultant solution was stirred overnight at room temperature. The mixture was concentrated as before, and after maintaining the concentrate under vacuum overnight to ensure complete separation of solvent, 80.0 g of a clear, light yellow liquid was obtained. The 1H and 13C NMR spectra of the final product were consistent with the structure of the desired phosphonic acid ligand. The 13C NMR spectrum of the product phosphonic acid showed the carbon α to phosphorus as a doublet (JC-P=138.8 Hz) at 27.17 ppm.

Sulfonic acid ligand. Ligand V was prepared as follows. To 100 g (0.167 mol) of polyetheramine (JEFFAMINE M-600 obtained from Huntsman, Mn=600) was added 17.88 g (0.146 mol) of melted propane sultone (purchased from TCI America). The mixture was heated to 80° C. and stirred for 16 hours. 1H NMR spectra shows complete consumption of the propane sultone. The sulfonic acid ligand was isolated as a red brown liquid and used without further purification.

Amide acid ligand. Ligand L-VII was prepared as follows. To a stirring solution of 150 g (0.250 mol) polyetheramine (JEFFAMINE M-600, Huntsman) in 1 L tetrahydrofuran was added 24 g (0.24 mol) succinic anhydride. After stirring for 16 hours, 1H NMR showed the succinic anhydride has been consumed. The tetrahydrofuran was removed under reduced pressure. The amide acid ligand was isolated as a red-brown liquid and was used without purification.

Drying Procedure. Nanocalcite (NPCC-111) was obtained as a 56 wt. % solids slurry in water. The slurry was air dried for three days and the resulting large chunks were pulverized in a blender.

Surface Modification and Dispersion Procedure 1.

Dried calcite and 5 wt. % of the ligand, based on the weight of calcite, were added to acetone. Samples were prepared using each of ligands L-I though L-VI (identified in Table 3). The dispersions were prepared using Mixing Procedure D, described below. The resulting dispersions were then added to an epoxy resin (EPON 825) and the acetone was removed in a rotavapor at a final temperature of 100° C. and pressure of 1330 Pa (10 torr). The concentration of calcite in the epoxy resin was measured by thermogravimetric analysis and was adjusted to 40 wt. % in the epoxy resin.

Surface Modification and Dispersion Procedure 2.

Nanocalcite (NPCC-111) was obtained as a 56 wt. % solids slurry in water. This aqueous slurry (950 grams) was diluted with 2000 grams of 1 methoxy-2-propanol while mixing with an air stirrer. To this dispersion, 25 grams of ligand L-VII (identified in Table 3) was added and Mixing Procedure D described below was used to process the dispersion. The resulting dispersion was added to epoxy resin (EPON 825). The water and 1-methoxy-2-propanol were removed in a rotavapor. The concentration of calcite was adjusted to 40 wt. %.

The structures of the ligands L-I to L-VII are summarized in Table 3. The viscosity of each surface-modified nanocalcite containing resin systems was measured using the Viscosity Test Method. The viscosities in Pa·s of the resin systems at 52 Hz are also reported in Table 3.

TABLE 3

Viscosities of epoxy resin containing 40 wt. % surface-modified nanocalcite.

| Ligand | Structure | Viscosity (Pa·s) |
|---|---|---|
| L-I | $H_3C-O-(CH_2CH_2O)_8-CH(CH_3)-NH-C(O)-C(O)-NH-OH$ | 28 |
| L-II | $H_3C-(O-CH_2CH_2)_n-O-C(O)-CH_2CH_2-C(O)-OH$, n = 10-12 | 15 |
| L-III | $H_3C-(O-CH_2CH_2)_n-O-C(O)-CH_2CH_2-C(O)-OH$, n = 6-8 | 17 |
| L-IV | $H_3C-(O-CH_2CH_2)_n-O-CH_2CH_2-P(O)(OH)_2$, n = 6-8 | 9 |
| L-V | $H_3C-O-(CH_2CH_2O)_8-CH(CH_3)-NH-CH_2CH_2CH_2-S(O)_2-OH$ | 8 |
| L-VI | $H_3C-(O-CH_2CH_2)_3-O-C(O)-CH_2CH_2-C(O)-OH$ | 27 |
| L-VII | $H_3C-O-(CH_2CH_2O)_8-CH(CH_3)-NH-C(O)-CH_2CH_2-C(O)-OH$ | 35 |

Typically, the greater the compatibility between the curable resin and the compatiblizing segment of the surface-modifying agent, the lower the viscosity at fixed conditions. However, as shown in Table 3, surprisingly the nature of the binding group also affected viscosity. Specifically, higher bond energy binding groups resulted in lower viscosity compositions even when the same compatiblizing group was used.

Nanoparticle Size.

Calcium carbonate has been used as a filler in resin systems. However, many commercially available fillers have a large average particle size, e.g., 1 to 10 microns. Even commercially available calcium carbonate material based on nanometer-sized primary particle sizes typically contain aggregates of such primary particles leading to an effective particle size significantly greater than the primary particle size. Even with common surface treatments, such aggregated particles may result in highly viscous resin systems at higher particle loadings.

In general, "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated particles are not broken down into smaller entities by, for example, shearing forces encountered during dispersion of the aggregated particles in a liquid. In contrast, "agglomerated" and agglomerates" are descriptive of a weak association of primary particles usually held together by charge or polarity. Agglomerated particles can typically be broken down into smaller entities by, for example, shearing forces encountered during dispersion of the agglomerated particles in a liquid.

Four mixing processes were evaluated to determine their effect on particle size and viscosity.

Mixing Procedure A—Air mixing. Epoxy resin was placed in a container along with a dispersing agent. The solution was stirred with an ACE AIR STIRRER connected to a 620 kPa (90 psi) air line. The air stirrer was fitted with a convention stainless steel shaft and stirrer blade. The air stirrer was run at the highest setting to provide very vigorous stirring while the nanocalcite aggregates were gradually added. The mixture was stirred until a smooth intimately mixed dispersion with no visible aggregates was obtained. The mixtures were typically stirred for 15 minutes after the addition of the nanocalcite aggregates. The final composition contained 45 wt. % calcite.

Mixing Procedure B—Cowles blade mixing. This method was identical to Mixing Procedure A except a Cowles mixing blade was attached to the air stirrer in place of the conventional stirring blade. The Cowles blade is designed to provide exceptionally high shear in the mixing procedure. The dispersions were typically stirred for 15 minutes after the addition of the nanocalcite aggregates. The final composition contained 45 wt. % calcite.

Mixing Procedure C—Silverson mixing. A liquid, either epoxy resin or solvent, was placed in a container along with a dispersing agent. The solution was agitated with a SILVERSON model L4R high shear mixer while slowly adding the nanocalcite aggregates. The speed of this high shear mixer was adjusted to allow the temperature to increase to 80° C. and then maintained at that temperature for 10 minutes. The final composition contained 45 wt. % calcite.

Mixing Procedure D—Netzsch mill. In this procedure the nanocalcite aggregates were pre-dispersed in a liquid, either an epoxy resin or solvent, with a SILVERSON high shear mixer as described in Mixing Procedure C. This dispersion was then further milled by repeated cycling through a NETZCH "Mini-Cer" zeta configuration bead mill having a zirconia chamber and zeta mixer. The chamber was 90% filled with 200 micron zirconia milling media. The chamber was cooled with circulating water and the temperature was maintained between 60 to 80° C. during milling. The dispersion was cycled through the mill between 10 and 20 times. The particle size was periodically evaluated until the desired state of dispersion was reached. The final composition contained 45 wt. % calcite.

Comparative Example 1

Calcite particles without surface treatment (NPC-111) were added to acetone at 20 wt. % solids and well-mixed using Mixing Procedure C. A highly thixotropic paste was obtained. Epoxy resin (EPON 825) was added to the acetone/calcite dispersion and the acetone was removed to provide a 40 wt. % dispersion of calcite in the epoxy. When the acetone was removed a solid, non-fluid mass was obtained.

Comparative Example 2

Calcite particles surface treated with stearic acid (NPCC-201) were well-mixed in toluene using Mixing Procedure C. An attempt was made to add this dispersion to epoxy resin (EPON 825) and remove the toluene. Again a pasty, non-fluid mass was obtained at a 40 wt. % dispersion of calcite in the epoxy.

Thus, even when well-mixed both the untreated and stearic acid treated calcite particles resulted in high viscosity compositions.

Comparative Examples CE-3 thru CE-6 and Examples 1 thru 4 were prepared using SOCAL 31 calcite, which was obtained as a dry powder. Comparative samples CE-3 and CE-4, and Examples 1 and 2 used Ligand L-V at 5 wt. % based on the weight of the calcite. Similarly, comparative samples CE-5 and CE-6, and Examples 3 and 4 used Ligand L-VII at 5 wt. % based on the weight of the calcite. Surface Modification and Dispersion Procedure 1 was used to prepare dispersions of surface modified calcite in epoxy resin (EPON 825) except that the mixing procedures identified in Table 4 were used.

The samples were cured using with an epoxy curing agent, (DETDA) at the level of 38 parts by weight curative per 100 parts epoxy resins (PPH). The components were adjusted so that the final calcite concentration was 35 wt %. The samples were cured in a forced air oven using the following protocol: 75° C. for 3 hours, 125° C. for 2 hours, and 150° C. for 2 hours. The size distribution of the calcite particles in the resin was measured according to the Calcite Particle Size Procedure. Samples were prepared and tested according to the Fracture Toughness Procedure. The percent of particles having a size of less than 400 nm and the fracture toughness ($K_{Ic}$) are reported in Table 4

TABLE 4

Effects of mixing on particle size and fracture toughness.

| Ex. | Ligand | Mixing Procedure | % less than 400 nm | $K_{Ic}$ (MPa·m$^{1/2}$) |
| --- | --- | --- | --- | --- |
| CE-3 | L-V | A | 44% | 0.92 |
| CE-4 | L-V | B | 48% | 1.13 |
| 1 | L-V | C | 67% | 1.4 |
| 2 | L-V | D | 97% | 1.49 |
| CE-5 | L-VII | A | 46% | 0.96 |
| CE-6 | L-VII | B | 59% | 0.96 |
| 3 | L-VII | C | 56% | 0.94 |
| 4 | L-VII | D | 78% | 1.18 |

Surface-modifying Agents with a Reactive Group.

Examples 6, 7 and 8 were prepared using the SOCAL 31 nanocalcite, which is a dried powder as received. Examples 9, 10 and 11 were prepared used NPCC-111 nanocalcite dried according to the Drying Procedure. Each ligand was used at 5 weight % based on the weight of the nanocalcite aggregates. Surface modification of the dried calcite and dispersion in epoxy resin (EPON 825) was performed according to Surface Modification and Dispersion Procedure 1 including the use of Mixing Procedure D. The resulting dispersions were degassed by placing in a stirred flask and heating to 80° C. subjecting to a vacuum of 1330 Pa (10 torr).

The samples were cured using with an epoxy curing agent, (DETDA) at the level of 38 parts by weight curative per 100 parts epoxy resins (PPH). The components were adjusted so that the final calcite concentration was 35 wt %. The samples were cured in a forced air oven using the following protocol: 75° C. for 3 hours, 125° C. for 2 hours, and 150° C. for 2 hours. Comparative Example CE-7 was prepared without calcite.

TABLE 5

Fracture toughness results according to the Fracture Toughness Procedure.

| Ex. | Ligand | Modifying group | Reactive | % less than 400 nm (*) | $K_{Ic}$ (MPa·m$^{1/2}$) |
|---|---|---|---|---|---|
| CE-7 | None | — | — | — | 0.6 |
| 6 | D530 | phosphoric acid polyester | No | 99% | 1.2 |
| 7 | D 111 | phosphoric acid polyester | No | 99% | 1.1 |
| 8 | L-V | polyetheramine sulfonic acid | Yes | 99% | 2.1 |
| 9 | L-VII | polyetheramide acid | No | 92% | 1.1 |
| 10 | L-IV | polyether phosphonic acid | No | 93% | 1.3 |
| 11 | L-V | polyetheramine sulfonic acid | Yes | 91% | 1.9 |

(*) Calcite particle size measured according to the Calcite Particle Size Procedure.

Examples 12, 13, and 14 were prepared using SOCAL 31 nanocalcite mixed directly into epoxy resin (EPON 825) using Mixing Procedure D. Varying weight percents of Ligand L-V based on the weight of the calcite aggregates were used in preparing the dispersions. The components were adjusted so that the final calcite concentration was 35 wt. %. The samples were cured and evaluated according to the Fracture Toughness Procedure.

TABLE 6

Fracture toughness results.

| Ex. | Ligand L-V polyetheramine sulfonate | % less than 400 nm (*) | $K_{Ic}$ (MPa·m$^{1/2}$) |
|---|---|---|---|
| 12 | 3 wt. % | 91% | 1.6 |
| 8 | 5 wt. % | 99% | 2.1 |
| 13 | 6 wt. % | N/A | 2.3 |
| 14 | 7 wt. % | 99% | 2.4 |

(*) Calcite particle size measured according to the Calcite Particle Size Procedure.

Nanocalcite dispersions were prepared using a combination of surface-modifying agents. Both surface-modifying agents included a binding group to attach the agent to the nanocalcite. For one surface-modifying agent, Example 15 used Ligand L-V, which includes a binding group, a compatiblizing segment, and a reactive group. Example 16 used Ligand L-VII, which has a binding group and a compatiblizing group, but which does not include a reactive group. Both examples used 3-(cyclohexylamino)-1-propanesulfonic acid (CAPS) as a second surface-modifying agent. CAPS includes a binding group and a reactive group, but does not include a compatiblizing group.

Examples 15 and 16 were prepared by dispersing SOCAL 31 calcite into epoxy resin (EPON 825) with Mixing Procedure D. The components were adjusted so that the final calcite concentration was 35 wt. %. The samples were cured and evaluated according to the Fracture Toughness Procedure.

TABLE 7

Fracture toughness results.

| Ex. | Surface treatment | % less than 400 nm (*) | $K_{Ic}$ (MPa·m$^{1/2}$) |
|---|---|---|---|
| 15 | 3% L-V + 2% CAPS | 96% | 2.1 |
| 16 | 3% L-VII + 2% CAPS | 92% | 2.2 |

(*) Calcite particle size measured according to the Calcite Particle Size Procedure.

Rubber Tougheners.

CE-8 was an epoxy resin (EPON 825) without calcite or rubber particles. CE-9 contained only the surface-modified calcite. A dispersion of SOCAL 31 calcite in epoxy resin (EPON 825) was prepared according to Surface Modification and Dispersion Procedure 1, using Ligand L-V. The components were adjusted so that the final calcite concentration was 25 wt. %. Comparative Example CE-10 included only the nano rubber particles. Nano-sized coreshell rubber particle (KANE ACE® MX-120, obtained as a 25 wt. % dispersion in epoxy resin (EPON 828) from Kaneka Texas Corporation), was diluted with EPON 825 epoxy resin and mixed using Mixing Procedure C. DETDA epoxy curative was added, followed by vacuum degassing and curing. The concentrations were adjusted to provide 5 wt. % rubber particles in the cured epoxy blend.

Examples 17 and 18 included the surface-modified calcite and 2.5 or 5 wt. %, based on epoxy weight, of a nano-sized coreshell rubber particle (KANE ACE® MX-120, wt. % coreshell rubber particles in EPON 828 epoxy resin). First, a dispersion of SOCAL 31 calcite in epoxy resin (EPON 825) was prepared according to Surface Modification and Dispersion Procedure 1, using Ligand L-V. Next the desired amount of rubber particles in epoxy resin was added to the dispersion followed by vigorous mixing and vacuum degassing. The ratio of components was adjusted to result in a 25 wt. % of calcite in the final cured specimens.

All of the samples were cured with DETDA epoxy curative at the level of 38 parts by weight curative per 100 parts epoxy resins (PPH). $K_{Ic}$ was measured according to the Fracture Toughness Procedure. Shear modulus (G') was measured according to the Shear Modulus Procedure.

TABLE 8

Mechanical property comparisons.

| Ex. | Ligand L-V | Nano-sized rubber | % less than 400 nm (*) | $K_{Ic}$ (MPa·m$^{1/2}$) | G' (GPa) |
|---|---|---|---|---|---|
| CE-8 | 0 wt. % | 0 wt. % | — | 0.7 | 1.16 |
| CE-9 | 5 wt. % | 0 wt. % | 92% | 2.4 | 1.62 |
| CE-10 | 0 wt. % | 5 wt. % | — | 1.8 | 1.16 |
| 17 | 5 wt. % | 2.5 wt. % | 92% | 3.2 | 1.59 |
| 18 | 5 wt. % | 5 wt. % | 92% | 3.4 | 1.57 |

(*) Calcite particle size measured according to the Calcite Particle Size Procedure.

The calcite dispersions used in Examples 19, 20, and 21 were prepared according to Surface Modification and Dispersion Procedure 1 using SOCAL 31 calcite and EPON 825 epoxy resin. Example 19 contained only the surface treated nanocalcite material. Example 20 contained the surface treated nanocalcite and nano-sized coreshell rubber (KANE ACE® MX-120). Example 21 contained the surface treated nanocalcite and micron-sized coreshell rubber (PARALOID EXA 2600 from Rohm & Haas). The components were adjusted so that the final calcite concentration was 25 wt. %.

Comparative Example C-11 contained only the epoxy resin, while Comparative Example C-12 contained 5 wt. % of the nano-sized coreshell rubber particles.

All samples were cured using a 1 to 1 weight ratio of Dicy curative and TDI/Urea accelerator. This combination was used at the level of 6 parts by weight to 100 parts epoxy resin. The samples were cured by heating first to 90° C. for two hours followed by 150° C. for one hour, and evaluated according to the Fracture Toughness Procedure. Shear modulus (G') was measured according to the Shear Modulus Procedure.

TABLE 9

Mechanical property comparisons.

| Ex. | Ligand L-V | Rubber | Rubber Size | % less than 400 nm (*) | $K_{Ic}$ (MPa·m$^{1/2}$) | G' (GPa) |
|---|---|---|---|---|---|---|
| CE-11 | — | — | — | — | 0.7 | 1.36 |
| CE-12 | — | 5% | nano | — | 1.1 | 1.26 |
| 19 | 5% | — | — | 92% | 0.9 | 2.19 |
| 20 | 5% | 5% | nano | 92% | 1.5 | 1.72 |
| 21 | 5% | 5% | micron | 92% | 2.1 | 1.72 |

(*) Calcite particle size measured according to the Calcite Particle Size Procedure.

Composites.

The rain erosion resistance of the two panels was evaluated using a testing apparatus used to mimic rain damage, as described in U.S. patent application Ser. No. 11/680,784 (Daniels et al., filed Mar. 1, 2007). Basically the device, using compressed nitrogen, fires pellets at 109+/−10 m/min (358+/−33 ft/sec) at a test specimen. The level of damage to the specimen is then visually evaluated.

A first, comparative, resin system was prepared using only epoxy resin (EPON 825). A second resin system was prepared using surface-modified nanocalcite in epoxy resin. Surface Modification and Dispersion Process 2 was used to prepare nanocalcite surface treated with ligand L-VII dispersed in epoxy resin (EPON 825). The second resin system contained 275 grams calcite and 275 grams epoxy. A curative (105 grams of DETDA) was added to both resin systems.

A fiberglass composite was prepared using a resin transfer molding process. Four layers of SAERTEX bi-diagonal glass (831 gm/m²) glass fabric was placed in 0.095 inch deep 12×12 inch RTM mold. The top and bottom plies were at a 0° orientation with the two middle plies at a 90° orientation to provide a balanced 45°+/−orientation. The resin system was injected into a mold that was preheated to 120° C. After 90 minutes the mold was heated to 150° C. and held at that temperature for 1 hour, after which the mold was allowed to cool slowly.

The comparative panel prepared using the resin system without nanocalcite was badly damaged after 170 rounds of pellets impacted the panel. The panel prepared with the nanocalcite-containing epoxy resin displayed only minor damage after 1585 rounds of pellets impacted the panel. The test demonstrated a dramatic improvement in erosion resistance of the panel prepared with the nanocalcite modified matrix resin.

A carbon fiber composite was prepared using a resin transfer molding (RTM) process. The composite reinforcement was a unidirectional fabric of TORAY T700 carbon fibers (154 g/m2) available from Saertex USA, LLC designated as S80CU990-0151. The unidirectional laminates were made by placing 16 layers of the carbon fabric in a 2.4 mm (0.095 inch) deep, 30 cm×30 cm (12 inch×12 inch) RTM mold resulting in a nominal thickness of 2.26 mm (0.089 inches) and a nominal carbon fiber volume fraction of about 60%. Panels were made using 30 wt. % calcite surface-modified with Ligand L-V dispersed in epoxy resin (EPON 825) using Mixing Process D. The samples were cured with 38 parts by weight DETDA per 100 parts epoxy resin. The resin system was injected into a mold that was preheated to 120° C. After 90 minutes the mold was heated to 150° C. and held at that temperature for 1 hour, after which the mold was allowed to cool slowly.

The calcite in Example 22 was fully dispersed and provided a panel that was completely impregnated with resin. A control panel was prepared by an identical process using the same epoxy resin/curative composition but containing no calcite particles (Comparative Example CE-13). The Resin Tensile Strength Procedure and the Composite Compression Strength Procedure were used to evaluate the samples.

TABLE 10

Carbon Fiber Compression Strength

| Ex | Ligand | % less than 400 nm (*) | Resin tensile modulus (GPa) | Compression strength (GPa) |
|---|---|---|---|---|
| CE-13 | — | — | 2.8 | 1.17 |
| Ex 22 | 5% L-V | 96% | 4.5 | 1.25 |

(*) Calcite particle size measured according to the Calcite Particle Size Procedure.

Effect of Heating.

In Example 23, 45 wt. % SOCAL 31 calcite surface modified with Ligand L-V was dispersed into epoxy resin (EPON 825) using a modification of Mixing Process D. During the milling process great care was taken to keep the dispersion as cool as possible and the milling time was reduced to minimize the samples heat history. The degassing process was done at room temperature. In Example 24 a portion of the Example 23 resin dispersion was heated for 4 hours at 80° C. The concentrations of both samples were adjusted to provide 35 wt. % calcite in the curable resin. Both samples were then cured with DETDA and evaluated according to the Fracture Toughness Procedure.

TABLE 11

Effect of heat history.

| Ex. | Heat History | % less than 400 nm (*) | $K_{Ic}$ (MPa·m$^{1/2}$) |
|---|---|---|---|
| 23 | minimal heating | 79% | 1.4 |
| 24 | 4 hours at 80° C. | 79% | 1.9 |

(*) Calcite particle size measured according to the Calcite Particle Size Procedure.

Various modifications and alterations of this invention will become apparent to those skilled in the art without departing from the scope and spirit of this invention.

What is claimed is:

1. A composition comprising surface-modified nanoparticles dispersed in a curable resin, wherein the surface-modified nanoparticles comprise calcite cores and a first surface-modifying agent bonded to the calcite, wherein the first surface-modifying agent comprises a binding group ionically bonded to the calcite and a compatibilizing segment compatible with the curable resin, wherein the binding group comprises a phosphonic acid, a sulfonic acid, a phosphoric acid, or a combination thereof, and further wherein the compatibilizing group comprises at least one of a polyethylene oxide, a polypropylene oxide, and a polyester, wherein at least 90%, of the calcite cores have an average size of less than 400 nm as measured by the Calcite Particle Size Procedure, wherein the first surface-modifying agent comprises a binding group ionically bonded to the calcite and a compatiblizing segment compatible with the curable resin, wherein the binding group has a bond energy of at least 0.70 electron volts to calcite as calculated using the Binding Energy Calculation Procedure assuming a calcium rich surface; and wherein wherein the difference between the solubility parameter of the curable resin and the solubility parameter of the compatiblizing group, as determined according to the Solubility Parameter Procedure, is no more than $4 \, J^{1/2} \, cm^{-3/2}$.

2. The composition according to claim 1, wherein the first surface-modifying agent further comprises a reactive group capable of reacting with the curable resin.

3. The composition according to claim 1, wherein the first surface-modifying agent is a zwitterion.

4. The composition according to claim 1, wherein the first surface-modifying agent comprises a polyetheramine.

5. The composition according to claim 1, further comprising a second surface-modifying agent bonded to the calcite, wherein the second surface-modifying agent comprises a binding group and a reactive group capable of reacting with the curable resin.

6. The composition according to claim 1, further comprising core shell rubber particles.

7. The composition according to claim 1, wherein the composition comprises at least 30 wt. % nanoparticles based on the total weight of the nanoparticles and the curable resin.

8. The composition according to claiml, wherein the composition comprises no greater than 2 wt. %, solvent.

9. A cured composition comprising the composition according to claim 1, wherein the curable resin is cured.

10. The cured composition of claim 9, wherein the first surface-modifying agent is reacted with the curable resin.

11. A coated article comprising a substrate and the cured composition of claim 9 bonded to at least a portion of the substrate.

12. A fibrous composite comprising the composition according to claim 1 and reinforcing fibers, wherein the reinforcing fibers are impregnated with the composition.

13. The fibrous composite of claim 12, wherein the surface-modifying agent is reacted with the curable resin.

\* \* \* \* \*